No. 639,363. Patented Dec. 19, 1899.
W. DOCKUM.
PISTON OR PLUNGER.
(Application filed Aug. 11, 1899.)
(No Model.)
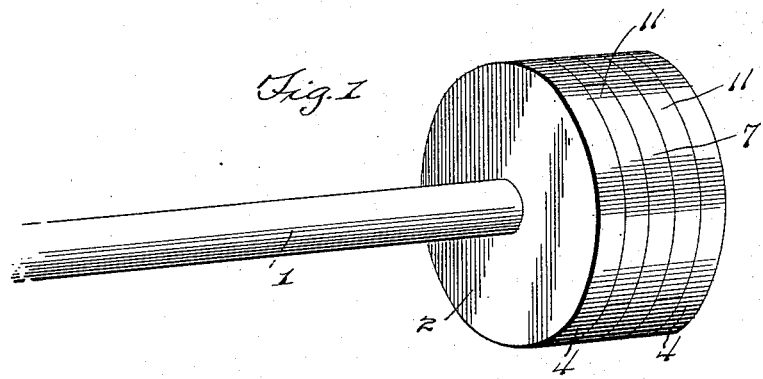
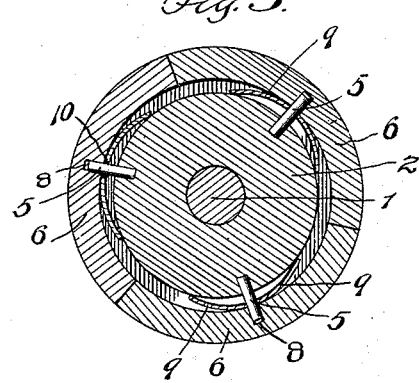
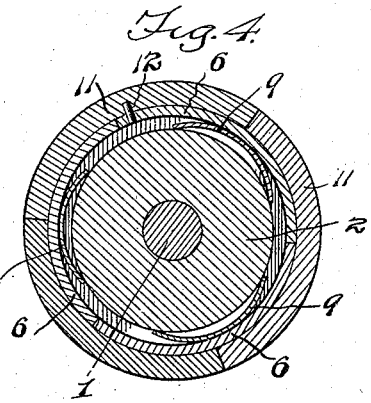
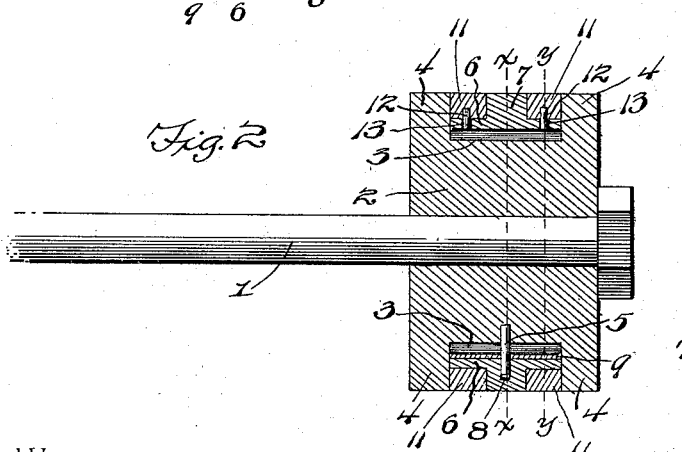
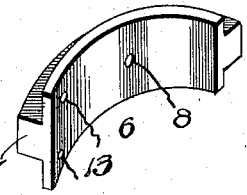
Witnesses
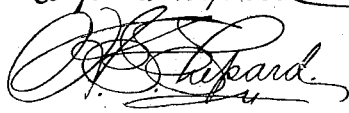
William Dockum, Inventor
By his Attorneys,
THE NORRIS PETERS CO., PHOTO-LITHO., WASHINGTON, D. C.

UNITED STATES PATENT OFFICE.

WILLIAM DOCKUM, OF OSTRANDER, OHIO.

PISTON OR PLUNGER.

SPECIFICATION forming part of Letters Patent No. 639,363, dated December 19, 1899.

Application filed August 11, 1899. Serial No. 726,901. (No model.)

*To all whom it may concern:*

Be it known that I, WILLIAM DOCKUM, a citizen of the United States, residing at Ostrander, in the county of Delaware and State of Ohio, have invented a new and useful Piston or Plunger, of which the following is a specification.

This invention relates to pistons and plungers, and has for its object to provide an improved metal packing therefor consisting of a plurality of sections yieldingly mounted upon the piston or plunger, so as to maintain a tight fit therefor, and means for preventing separation or displacement of any of the parts thereof.

To these ends the present invention consists in the combination and arrangement of parts, as will be hereinafter more fully described, shown in the accompanying drawings, and particularly pointed out in the appended claim, it being understood that the improvement is susceptible of various changes in the form, proportion, size, and the minor details of construction without departing from the spirit or sacrificing any of the advantages of this invention.

In the drawings, Figure 1 is a perspective view of a piston or plunger having the improved packing applied thereto. Fig. 2 is a longitudinal sectional view thereof. Fig. 3 is a transverse sectional view on the line $x\ x$, Fig. 2. Fig. 4 is a transverse sectional view on the line $y\ y$, Fig. 2. Fig. 5 is a detail perspective view of one of the ring-sections.

Corresponding parts are designated by like reference characters in all the figures of the drawings.

Referring to the accompanying drawings, 1 designates a plunger or piston-rod having the head 2 fitted to one end thereof. As clearly indicated in Fig. 2 of the drawings, the head is solid and provided with a comparatively wide circumferential peripheral groove 3, which forms the opposite circumferential flanges 4, extending flush with the respective flat faces or ends of the head.

The groove 3 is adapted to receive the several sections of the packing and is provided with radial pins 5, projecting outward from the base of the groove and midway between the sides thereof. These pins are preferably three in number and are disposed at equidistant points about the periphery of the head. Removably fitted in the groove 3 is a packing-ring composed of three sections 6, each consisting of a flat arcuate band having a longitudinal external rib 7 extending the entire length of the band and located midway between the sides thereof. It will be noted by reference to Figs. 2 and 3 that the individual arcuate bands 6 fit snugly the groove 3 from side to side thereof and the contiguous ends abut flush, so as to form a continuous ring extending entirely around the head. Each ring-section 6 is provided with a socket or recess 8 in its under face midway of its length and adapted to receive one of the pins 5, so as to prevent circumferential movement of the section. Interposed between each ring-section and the base of the groove 3 is a bowed leaf-spring 9, having a central opening 10 formed therethrough and receiving the respective pin 5. The springs fit the entire width of the groove 3 and have their ends engaging the base of the groove and the outer convex faces thereof bearing against the inner adjacent faces of the respective ring-sections 6, so as to permit of a radial movement thereof, and thereby yieldingly mount the same upon the head. The sockets or recesses 8, formed in the ring-sections, are longer than the pins 5 fitted therein, so as to provide for the yielding movement of the sections, and thus it will be seen that the ring-sections do not fit directly against the head or base of the groove 3, but are spaced out of contact therewith, so that the sections may not be rigidly mounted upon the head, but capable of a radial yielding movement, so as to maintain a tight fit within the bore of the cylinder.

Fitted to the outer faces of the ring-sections at opposite sides of the ribs 7 and between the latter and the opposite side walls of the groove 3 are a plurality of bowed or arcuate metallic packing-strips 11, arranged to break joints with the ring-sections. As indicated in Fig. 2, it will be seen that each of a pair of these packing-strips at opposite sides of the rib 7 of one of the ring-sections is provided with a pin or lug 12, projecting inward from the inner face of the strip intermediate of the ends thereof and seated in openings 13, formed through the adjacent ring-section at opposite sides of the rib and near one end thereof, so as to prevent circumferential movement of the strips upon the ring-section. As the several strips at opposite sides of the rib 7 abut at their contiguous ends, it is sufficient to provide one strip of each series with a pin, as will be understood.

By reference to Fig. 2 it will be seen that the outer faces of the ribs 7, the bowed or arcuate packing-strips 11, and the flanges 4 are all normally flush with each other, so as to provide the head with a smooth unbroken peripheral surface to fit snugly the bore of a cylinder. As the latter and the plunger become worn the bowed springs 9 force outward the ring-sections 6 and the packing-strips 11 carried thereby, so that the wear may be taken up and the proper fit of the head maintained.

It will be understood that the present packing may be effectively employed in connection with water, steam, oil, or air, as the several sections of the packing are mounted separately and yield individually, so that the head may fit perfectly the bore of the cylinder, and by reason of the fact that the sections are arranged to break joints escape of the steam, water, oil, or air through said joints is effectively prevented.

What I claim is—

The combination with a piston or plunger having a circumferential groove, and radial pins projecting from the base of the groove, of a packing-ring comprising separate sections having intermediate longitudinal ribs and provided with sockets or recesses adapted to slidably receive the respective pins, bowed leaf-springs interposed between the respective ring-sections and the base of the groove and provided with central openings loosely receiving the respective pins, and a plurality of arcuate packing-strips fitted upon the outer face of the packing-ring and at opposite sides of the ribs of the ring-sections, some of the packing-strips being provided with pins adapted to register with openings formed in the respective ring-sections, substantially as shown and described.

In testimony that I claim the foregoing as my own I have hereto affixed my signature in the presence of two witnesses.

WILLIAM DOCKUM.

Witnesses:
S. B. MYERS,
CHARLES HODGES.